(12) United States Patent
Kao et al.

(10) Patent No.: US 9,894,318 B1
(45) Date of Patent: Feb. 13, 2018

(54) METHOD FOR OUTPUT CONTROL OF VIDEOS FROM MULTIPLE AVAILABLE SOURCES AND USER TERMINAL USING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Ming-Chuan Kao, New Taipei (TW); Cheng-Han Shih, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/381,124

(22) Filed: Dec. 16, 2016

(30) Foreign Application Priority Data

Nov. 24, 2016 (TW) .............................. 105138574 A

(51) Int. Cl.

| | |
|---|---|
| *H04N 7/15* | (2006.01) |
| *H04N 7/14* | (2006.01) |
| *G06F 3/0484* | (2013.01) |
| *G06F 3/0488* | (2013.01) |

(52) U.S. Cl.
CPC .............. *H04N 7/147* (2013.01); *H04N 7/15* (2013.01); *G06F 3/04842* (2013.01); *G06F 3/04883* (2013.01)

(58) Field of Classification Search
CPC combination set(s) only.
See application file for complete search history.

(56) References Cited

U.S. PATENT DOCUMENTS

| | | | |
|---|---|---|---|
| 6,313,822 B1* | 11/2001 | McKay | ..................... G06F 3/14 345/545 |
| 6,317,164 B1* | 11/2001 | Hrusecky | ................. H04N 5/45 348/564 |
| 2011/0249073 A1 | 10/2011 | Cranfill et al. | |
| 2013/0142452 A1* | 6/2013 | Shionozaki | ........... G06T 15/503 382/284 |
| 2014/0164990 A1 | 6/2014 | Kim et al. | |

(Continued)

FOREIGN PATENT DOCUMENTS

| | | |
|---|---|---|
| CN | 105159578 A | 12/2015 |
| TW | I462566 B | 11/2014 |

*Primary Examiner* — Joseph J Nguyen
(74) *Attorney, Agent, or Firm* — ScienBiziP, P.C.

(57) ABSTRACT

A method for control of video output applied to multiple available video sources, the method being executed by a user terminal having a touch-sensitive display which comprises a plurality of sub-regions for displaying contents from multi-channel video sources. The sub-regions comprise at least a first sub-region and a second sub-region. A touch operation on the touch-sensitive display is detected and includes a sliding operation. Contents of the first sub-region and contents of the second sub-region are exchanged according to start position and end position of the sliding operation. Users are able to control the output layouts of the contents from the multi-channel video sources by operating the user terminal according to individual needs.

6 Claims, 5 Drawing Sheets

(56) References Cited

U.S. PATENT DOCUMENTS

2014/0365873 A1* 12/2014 Willis ................... G06F 17/212
                                                   715/243
2015/0109400 A1    4/2015 Wang
2016/0212486 A1*  7/2016 Liu ................... H04N 21/47202

* cited by examiner

METHOD FOR OUTPUT CONTROL OF VIDEOS FROM MULTIPLE AVAILABLE SOURCES AND USER TERMINAL USING THE SAME

FIELD

The subject matter herein generally relates to data communications.

BACKGROUND

In a video conference, there are multi-channel video sources. The contents of the multi-channel video sources are rendered on a user terminal according to an output layout which is predefined by an administrator.

However, terminal users cannot control output layouts according to their requirements. A more convenient method for output layout management should be provided for the terminal users, thereby enabling the contents of the multi-channel video sources to be rendered on user terminals according to user-desired output layouts.

BRIEF DESCRIPTION OF THE DRAWINGS

Implementations of the present technology will now be described, by way of example only, with reference to the attached figures, wherein.

DETAILED DESCRIPTION

Figure 1:
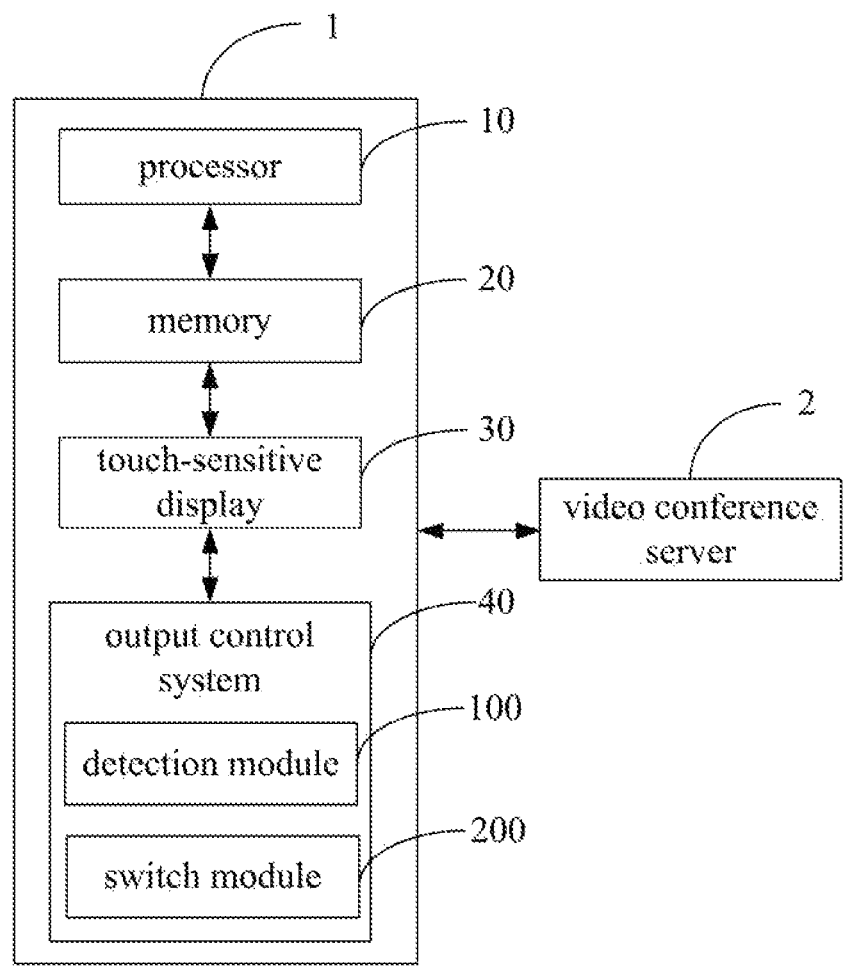
FIG. 1 is a block diagram of an exemplary embodiment of functional modules of a user terminal.

It will be appreciated that for simplicity and clarity of illustration, where appropriate, reference numerals have been repeated among the different figures to indicate corresponding or analogous elements. In addition, numerous specific details are set forth in order to provide a thorough understanding of an exemplary embodiment described herein. However, it will be understood by those of ordinary skill in the art an exemplary embodiments described herein can be practiced without these specific details. In other instances, methods, procedures, and components have not been described in detail so as not to obscure the related relevant feature being described. Also, the description is not to be considered as limiting the scope of an exemplary embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates an exemplary embodiment of functional modules of a user terminal 1. The user terminal 1 communicates with a video conference server 2. The user terminal 1 may be, for example, a mobile phone, a computer supporting functions of video conference, and the like. The video conference server 2 may be, for example, a cloud server.

The user terminal 1 includes a processor 10, a memory 20, a touch-sensitive display 30 and an output control system 40. The touch-sensitive display 30 is utilized for displaying and receiving input from a user, such as touch inputs. The touch-sensitive display may be a capacitive touch-sensitive display, a resistive touch-sensitive display, or an infrared inductive touch-sensitive display. The system 40 can control an output layout on the touch-sensitive display 30 in response to touch inputs.

The output control system 40 includes a detection module 100 and a switch module 200. The modules 100-200 can be executed by one or more processors (for example the processor 10) to achieve functionality. The memory 20 can store code and data of the output control system 40.

In an exemplary embodiment, the user terminal 1 defines a display region on the touch-sensitive display 30 for rendering multi-media contents. The display region is divided into a plurality of sub-regions. Each sub-region renders multi-media contents from one of the multi-channel video sources. For example, the first sub-region renders contents of a first video source of the multi-channel video sources, while the second sub-region renders contents of a second video source of the multi-channel video sources.

The detection module 100 detects a touch operation on the touch-sensitive display 30. The touch operation may be a sliding operation or a click operation. In an exemplary embodiment, the user terminal detects touch operations on the touch-sensitive display 30 by detecting heat or pressure, infrared, and other types of sensing. The touch operation on the touch-sensitive display 30 can be made by fingertip or stylus pen. The sensitivity of the detection module 100 for detecting detects the operation on the touch-sensitive display 30 can have a preset or default frequency.

The contents of the first sub-region can be exchanged with the contents of the second sub-region in response to a sliding operation. A sliding operation is detected as a movement having a start position located in the first sub-region and an end position located in the second sub-region. When the sliding operation is detected, the switch module 200 exchanges contents of the first sub-region for contents of the second sub-region. In other words, the contents from the second video source is then rendered in the first sub-region, and the contents from the first video source is then rendered in the second sub-region.

In an exemplary embodiment, the switch module 200 sends a control command to the video conference server 2 to enable the video conference server 2 to switch the contents of the sub-regions. The video conference server 2 changes the display from the preset first output layout to a second output layout according to the control command. Regarding the second output layout, the first sub-region is configured to render the contents from the second video source and the second sub-region is configured to render the contents from the first video source. According to the second output layout, the video conference server 2 combines images of contents of all the sub-regions into a single image and transmits the single image to the user terminal 1. In this exemplary embodiment, the size, shape, or position, and other features of the first sub-region or the second sub-region are not limited to the present disclosure.

Figure 2:
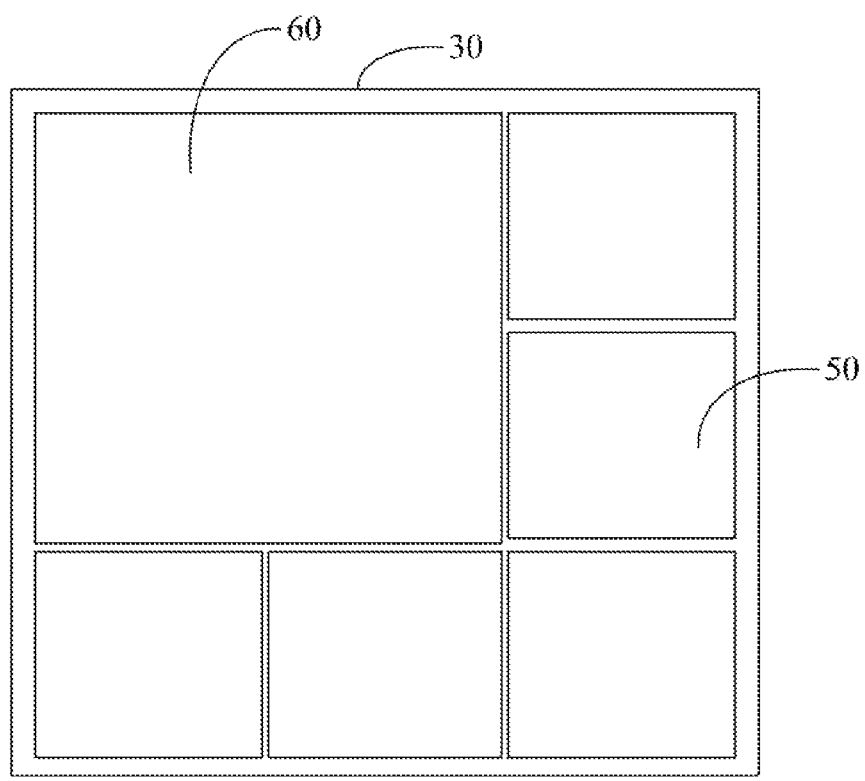
FIG. 2 is a schematic diagram of an exemplary embodiment of a preset output layout including a plurality of sub-regions for displaying contents from multi-channel video sources.

FIG. 2 illustrates an exemplary embodiment of a preset output layout including six sub-regions for displaying contents from six-channel video sources. The six sub-regions include at least a sub-region 50 (the first sub-region), and a sub-region 60 (the second sub-region). The sub-region 50 is configured to render contents from the first video source, and the sub-region 60 is configured to render contents from the second video source.

Referring to FIG. 2, when a sliding operation is detected, the start position being located in the sub-region 50 and the end position being located in the sub-region 60, the switch module 200 sends a control command to the video conference server 2. The video conference server 2 performs a switch operation to change the display from the preset first output layout to a second output layout. Regarding the second output layout, the sub-region 50 is configured to render the contents from the second video source while the sub-region 60 is configured to render the contents from the first video source. According to the second output layout, the video conference server 2 combines images of contents of all the sub-regions into a single image and transmits the single image to the user terminal 1. Before receiving a next control command, the video conference server synthesizes and transmits each frame image according to the second output layout.

In another exemplary embodiment, when a click operation which is located in a fourth sub-region of the sub-regions is detected on the touch-sensitive display 30, the switch module 200 exchanges the contents of a third sub-region for the contents of the fourth sub-region. Compared with other sub-regions of all the sub-regions, the third sub-region includes at least one different character, such as, a size, a shape, or a position, or the like. The third sub-region is configured to render contents from a third video source. The fourth sub-region, being one of the other sub-regions of all the sub-regions, is configured to render contents from a fourth video source.

In an exemplary embodiment, the switch module 200 sends a control command to the video conference server 2 according to a preset third output layout and position of the sub-region which has been clicked. The video conference server 2 changes the display from the preset third output layout to a fourth output layout according to the control command. In the fourth output layout, the third sub-region is configured to render the contents from the fourth video source and the fourth sub-region is configured to render the contents from the third video source. According to the fourth output layout, the video conference server 2 combines images of contents of all the sub-regions into a single image and transmits the single image to the user terminal 1.

In an exemplary embodiment, the switch module 200 displays the contents of the third sub-region in a full-screen-display mode on the user terminal when the click operation is done in the third sub-region.

Figure 3:
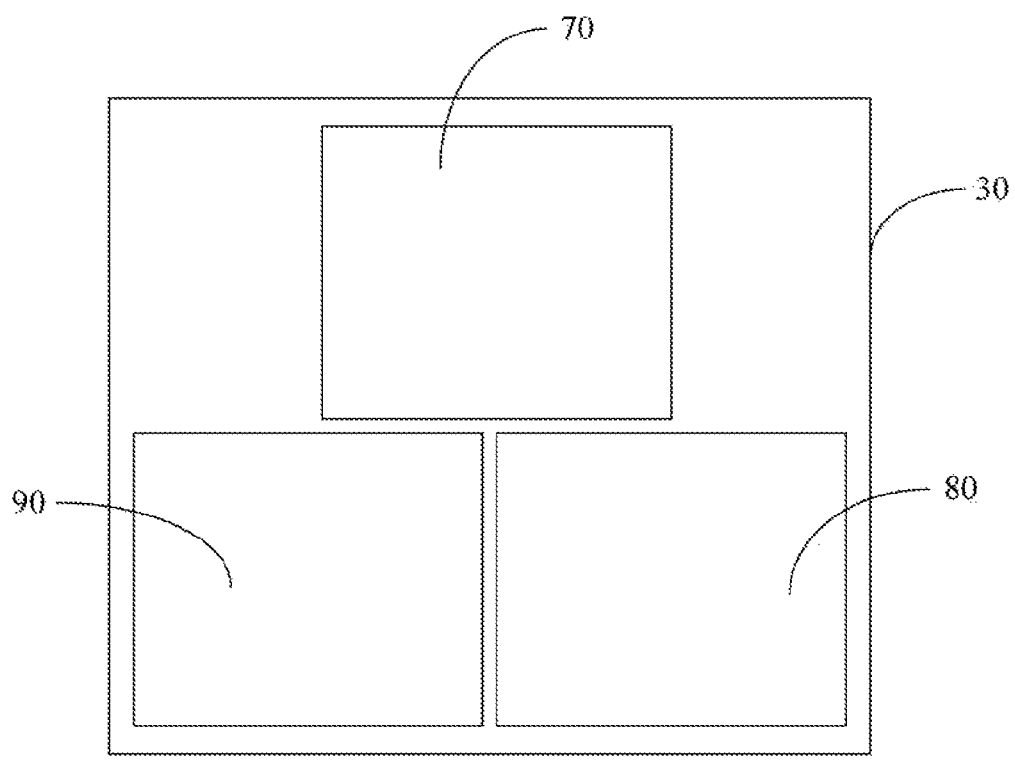
FIG. 3 is a schematic diagram of another exemplary embodiment of a preset output layout including a plurality of sub-regions for displaying contents from the multi-channel video sources.

FIG. 3 illustrates a preset third output layout composed of three sub-regions for displaying contents from three-channel video sources. The three sub-regions include a sub-region 70 (the third sub-region), a sub-region 80 (the fourth sub-region) and a sub-region 90. The size of the sub-region 70 is different from the sub-region 80 and the sub-region 90. The sub-region 70 is configured to render contents from the first video source, the sub-region 80 is configured to render contents from the second video source, and the sub-region 90 is configured to render contents from the third video source.

When a click operation located in the sub-region 80 is detected, the switch module 200 sends a control command to the video conference server 2 according to the preset third output layout and position of the sub-region which has been clicked. The video conference server 2 changes the display from the preset third output layout to a fourth output layout according to the command. In the fourth output layout, the sub-region 70 is configured to render the contents from the second video source, while the sub-region 80 is configured to render the contents from the first video source. According to the fourth output layout, the video conference server 2 combines images of contents of all the sub-regions into a single image and transmits the single image to the user terminal 1.

When the click operation occurs in the sub-region 70, the switch module 200 displays the contents of the sub-region 70 in a full-screen-display mode.

Figure 4:
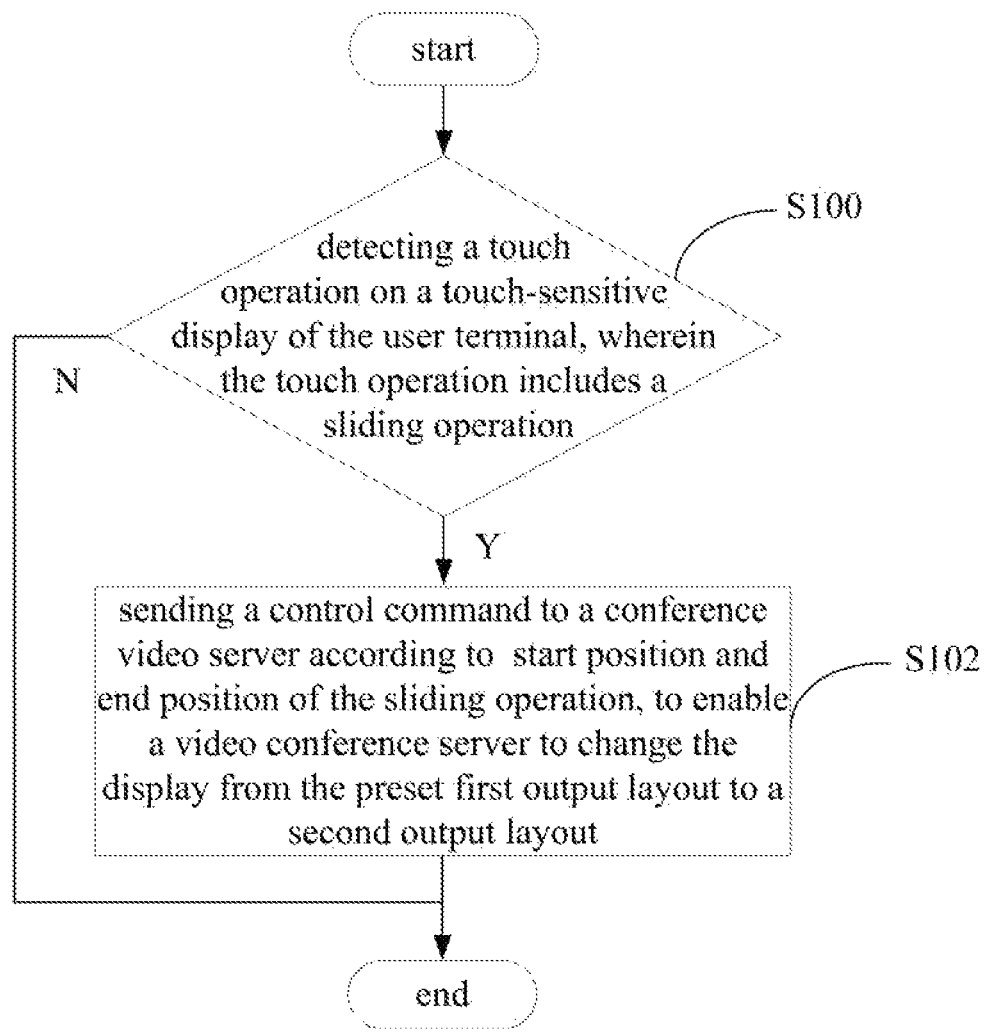
FIG. 4 illustrates a flowchart of an exemplary embodiment of a method for output control of video from multiple available sources.

The FIG. 4 illustrates a flowchart of an exemplary embodiment of a method for controlling output of videos.

A display region on the touch-sensitive display of a user terminal is configured for rendering multi-media content. The display region is divided into a plurality of sub-regions each of which renders multi-media content from one of the multi-channel video sources. For example, a first sub-region is configured to render contents from a first video source of the multi-channel video sources, and a second sub-region is configured to render contents from a second video source of the multi-channel video sources. In one exemplary embodiment, the display region may be divided according to a preset first output layout. The method comprises:

At block S100, detecting a touch operation on a touch-sensitive display of the user terminal, wherein the touch operation includes a sliding operation.

At block S102, sending a control command to a video conference server, when the sliding operation is detected, the start position of the sliding operation being located in the first sub-region and end position of the sliding operation being located in the second sub-region. The video conference server changes the display from the preset first output layout to a second output layout, wherein the first sub-region is configured to render the contents from the second video source and the second sub-region is configured to render the contents from the first video source. According to the second output layout, the video conference server combines contents of all the sub-regions into a single image and transmits the image to the user terminal.

Figure 5:
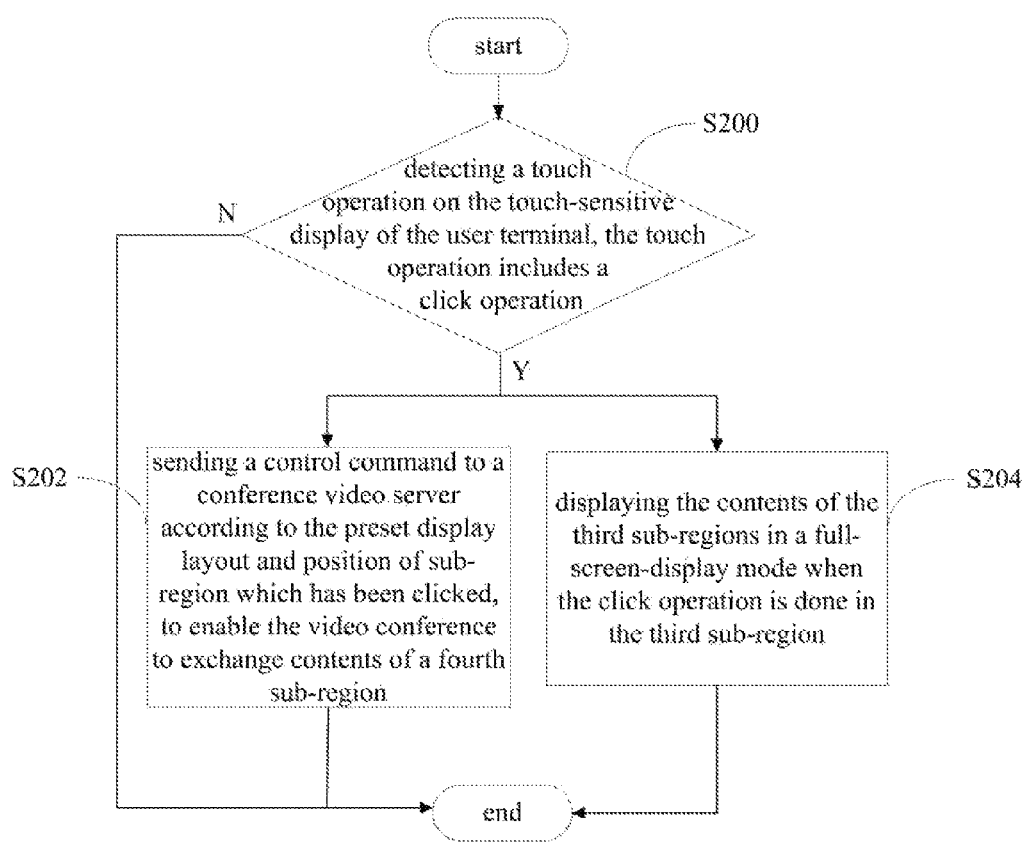
FIG. 5 illustrates a flowchart of another exemplary embodiment of a method for output control of videos from multiple available sources.

The FIG. 5 illustrates a flowchart of another exemplary embodiment of a method for controlling output of videos.

A display region on the touch-sensitive display of the user terminal is configured for rendering multi-media content. The display region is divided into a plurality of sub-regions and each of which renders multi-media content from one of multi-channel video sources. For example, a third sub-region is configured to render contents from a third video source of the multi-channel video sources. Compared with other sub-regions of all the sub-regions, the third sub-region includes at least one different character, such as a size, a shape, or a position, or the like. In an exemplary embodiment, the display sub-region may be divided according to a preset third output layout. The method comprises:

At the block S200, detecting a touch operation on the touch-sensitive display of the user terminal, wherein the touch operation includes a click operation.

At the block S202, sending a command to a conference video server according to the preset third output layout and position of sub-region which has been clicked, when the click operation is being located in a fourth sub-region is detected. The fourth sub-region, being one of other sub-regions of all the sub-regions, is configured to render contents from a fourth video source of the multi-channel video sources. The video conference server changes the display from the preset third output layout to a fourth output layout, wherein the third sub-region is configured to render the contents from the fourth video source and the fourth sub-region is configured to render the contents of the third video source. According to the fourth output layout, the video conference server combines contents of all the sub-regions into a single image and transmits the single image to the user terminal.

At the block S204, displaying the contents of the third sub-regions in a full-screen-display mode when the click operation is done in the third sub-region.

The user terminal and the method for output control can make contents from a video conference be rendered on the user terminal with a user-desired output layout. Users can flexibly control the output layout of contents from the multi-channel video sources by simple operation, which gives the user a good experience.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claim.

What is claimed is:

1. A method for output control of videos from multiple available sources, executed by a user terminal having a touch-sensitive display comprising a plurality of sub-regions for displaying contents from multi-channel video sources, the sub-regions comprising at least a first sub-region, a second sub-region, and a third sub-region which includes at least one different character than other sub-regions of the sub-regions, wherein the at least one different character corresponds to a shape or a position, the method comprising:
    detecting a touch operation on the touch-sensitive display, wherein the touch operation comprises a sliding operation starting in the first sub-region and ending in the second sub-region;
    exchanging contents of the first sub-region for contents of the second sub-region; and
    exchanging contents of the third sub-region for contents of a fourth sub-region of the sub-regions when the touch operation is a click operation that is located in the fourth sub-region.

2. The method of claim 1, wherein the first sub-region is configured to render contents from a first video source and the second sub-region is configured to render contents from a second video source according to a preset first output layout, wherein the exchanging step further comprising:
    sending a control command to a conference video server according to the start position and the end position of the sliding operation; and
    when the control command is received, the video conference server adjusting the preset first output layout to a second output layout, wherein the first sub-region is configured to render the contents from the second video source and the second sub-region is configured to render the contents from the first video source, and images of contents of the sub-regions are combined into a single image, and transmitting the single image to the user terminal.

3. The method as claim 2, further comprising:
    displaying the contents of the third sub-region in a full-screen-display mode when the click operation is done in the third sub-region.

4. A user terminal equipped with a touch-sensitive display having a plurality of sub-regions for displaying contents from multi-channel video sources, the sub-regions comprising at least a first sub-region, a second sub-region, and a third sub-region which includes at least one different character than other sub-regions of the sub-regions, the at least one different character corresponds to a shape or a position, the terminal comprising:
    a touch-sensitive display;
    at least one processor;
    a non-transitory storage system coupled to at least the one processor and configured to store one or more programs that are to be executed by the at least one processor, the one or more programs comprises instructions for:
        detecting a touch operation on the touch-sensitive display, wherein the touch operation comprises a sliding operation starting in the first sub-region and ending in the second sub-region;
        exchanging contents of the first sub-region for contents of the second sub-region; and
        exchanging contents of the third sub-region for contents of a fourth sub-region of the sub-regions when the touch operation is a click operation that is located in the fourth sub-region.

5. The user terminal as claim 4, wherein the first sub-region is configured to render contents from a first video source and the second sub-region is configured to render contents from a second video source according to a preset first output layout, wherein the one or more programs further comprise instructions for:
    sending a control command to a conference video server according to the start position and the end position of the sliding operation; and
    when the control command is received, the video conference server adjusting the preset first output layout to a second output layout, wherein the first sub-region is configured to render the contents from the second video source and the second sub-region is configured to render the contents from the first video source, and images of contents of the sub-regions are combined into a single image, and transmitting the single image to the user terminal.

6. The user terminal as claim 5, wherein the one or more programs further comprise instructions for:

displaying the contents of the third sub-region in a full-screen-display mode when the click operation is done in the third sub-region.

* * * * *